Figure 1:
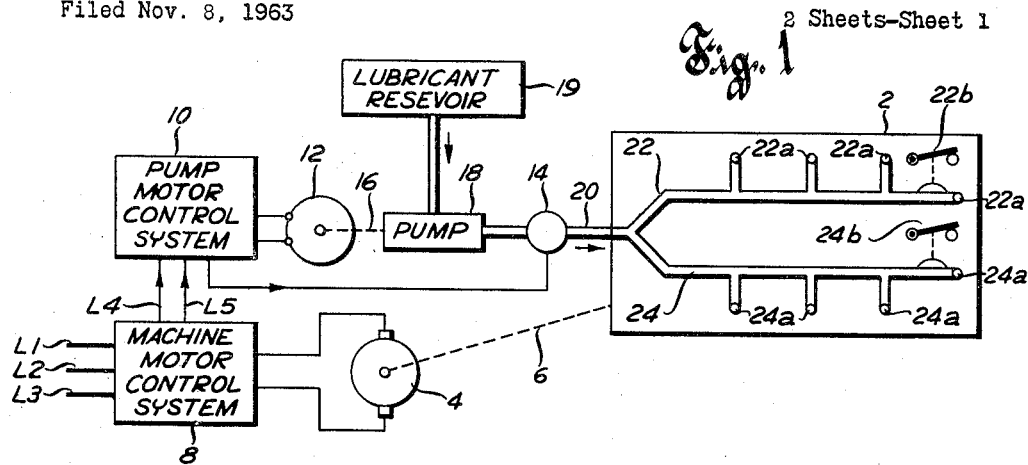

April 5, 1966  D. W. FATH ETAL  3,244,256
UNATTENDED LUBRICATION SYSTEM
Filed Nov. 8, 1963  2 Sheets-Sheet 1

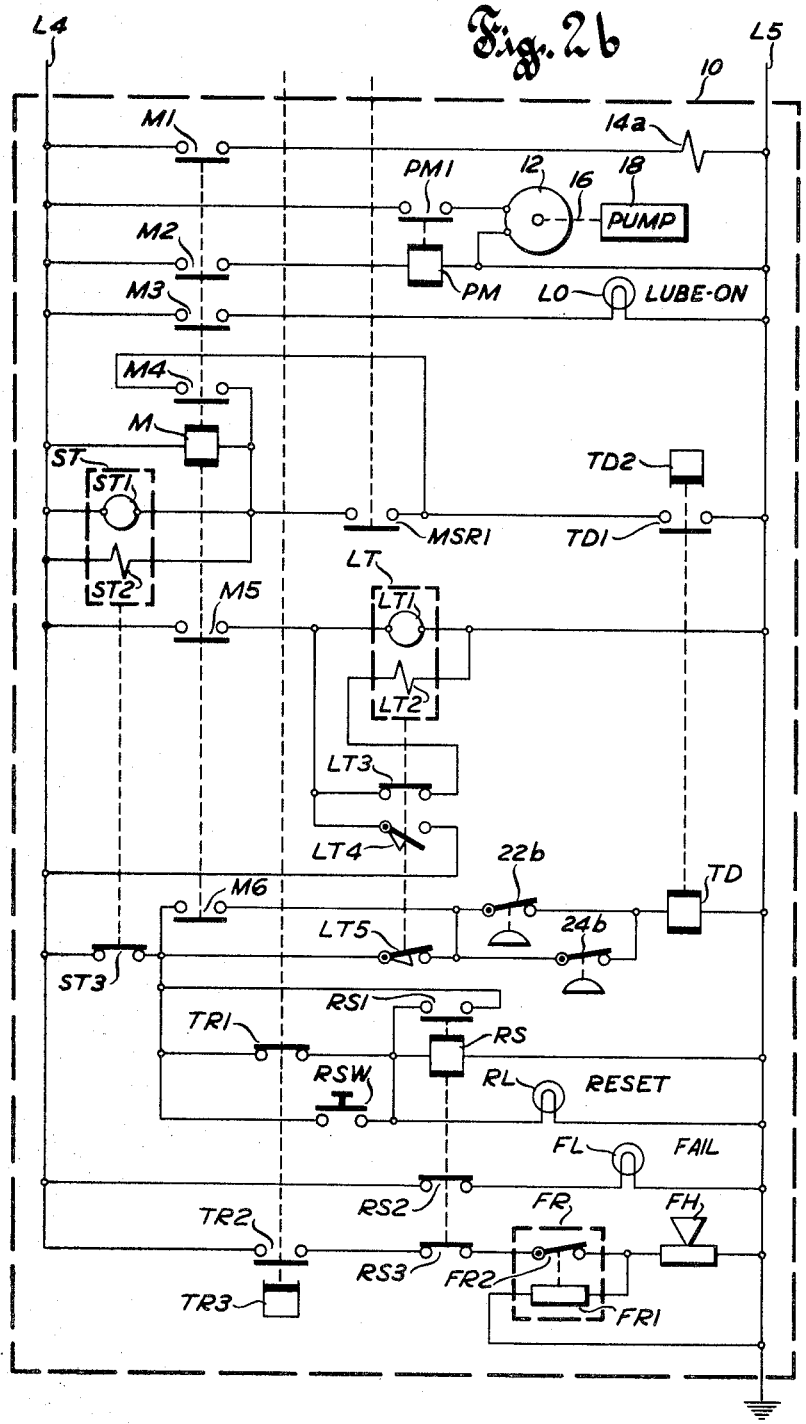

United States Patent Office 3,244,256
Patented Apr. 5, 1966

3,244,256
UNATTENDED LUBRICATION SYSTEM
Douglas W. Fath, Brookfield, and Robert L. Risberg, Milwaukee, Wis., assignors to Cutler-Hammer, Inc., Milwaukee, Wis., a corporation of Delaware
Filed Nov. 8, 1963, Ser. No. 322,398
7 Claims. (Cl. 184—7)

This invention relates to unattended lubrication systems and more particularly to electrically operated lubrication systems of the time-controlled and condition-responsive type for applying lubricant at preselected time intervals without the attention of an operator.

While not limited thereto, the invention is especially applicable to machines of the type which are desired to be operated continuously for long periods of time following each starting thereof such as printing presses or the like and which have a large number of points requiring lubrication.

An object of the invention is to provide an improved unattended lubrication system.

A more specific object of the invention is to incorporate in an electrically operated lubrication system of the time-controlled and condition-responsive type improved fail-safe features.

Another specific object of the invention is to incorporate in an electrically-operated lubrication system improved fail-safe means whereby the application of lubricant is discontinued in the event of a failure in the control system thereof.

Another object of the invention is to provide in such fail-safe lubrication control system means for discontinuing the application of lubricant in response to a predetermined lubricating condition.

Another specific object of the invention is to provide in such fail-safe lubrication control system means for discontinuing the application of lubricant after a predetermined time interval in the event the aforesaid lubricating-condition-responsive means fails to function properly.

Another specific object of the invention is to provide in such fail-safe lubrication control system alarm signal means operable in the event the application of lubricant is not completed in a predetermined time interval.

Another specific object of the invention is to provide in such fail-safe lubrication control system, in conjunction with such alarm signal means, manual control means for resetting the alarm signal means and means momentarily operable when the machine to be lubricated is started for resetting the alarm signal means independently of such manual control means so that the alarm signal is not given when the machine is started.

A further object of the invention is to provide an unattended lubrication system having the aforesaid features which is simple in construction and reliable in operation.

Other objects and advantages of the invention will hereinafter appear.

According to the invention, there is provided an electrically operated system for periodically lubricating a plurality of points on a machine such as a printing press. The lubricating system is provided with a motor driven pump for pumping lubricant such as grease through a main conduit having a solenoid-operated valve therein to and through a plurality of branch conduits to a multiplicity of lubrication points such as machine bearings or the like through respective feed-in devices. The system is provided with control means for opening the main conduit valve and for starting the pump motor each time the machine is started. A pressure-operated switch is located at the end of each branch conduit. These pressure switches are normally closed and are opened when the lubricant pressure reaches a predetermined value indicative of sufficient lubricant having been applied through the corresponding feed-in devices whereby to stop the pump motor. These pressure switches are connected in parallel in the circuit of a motor control relay so that the relay will be deenergized to stop the pump motor when all such switches are open. This arrangement provides a fail-safe system because failure to complete a circuit will prevent or stop the pump. Also, a circuit can be opened more reliably than one can be closed as a result of which excessive pumping is not likely to occur in the event of a failure in the system. The system is provided with a short period timer for additional protection whereby the pump is stopped in the event one or more of the pressure switches fails to open. The system is provided with a long period timer for initiating another lubrication cycle after a period of two hours, for example, depending upon the setting of such a long period timer. Each such timer is arranged to be automatically reset for another operation after it has performed its function. Pneumatic time delay means is provided in the system to afford time for the long period timer completely to reset after it has timed out and before the lubrication cycle and such timer are restarted to insure correct timing of the intervals between lubrication cycles. An alarm circuit is controlled by the short period timer to indicate that an abnormal condition occurred. This alarm circuit is provided with a manual resetting switch and also with a resetting switch operable momentarily and concurrently with starting of the machine so that the alarm will not sound when the machine is started.

Figure 2A:
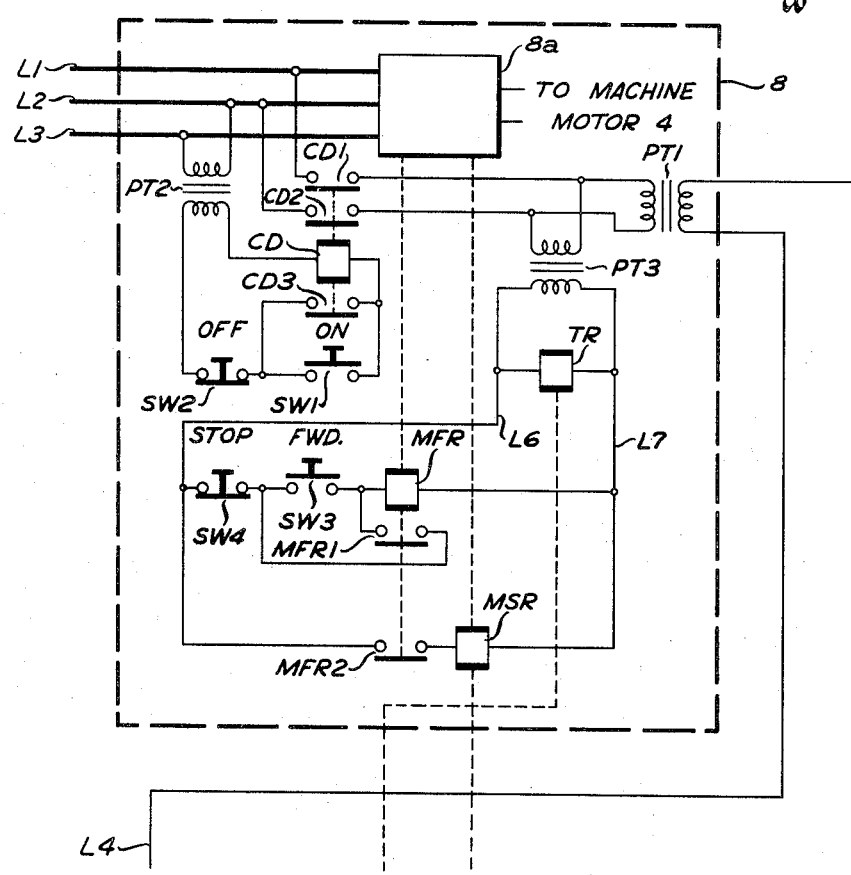

These and other objects and advantages of the invention and the manner of obtaining them will best be understood by reference to the following description of and embodiment thereof taken in conjunction with the accompanying drawings, wherein:

FIGURE 1 is a schematic illustration of an unattended lubrication system and a machine to which it may be applied; and FIGS. 2a and 2b diagrammatically shows an electrical control system for the lubrication system of FIG. 1 and its relation thereto.

Referring to FIG. 1, there is schematically shown a machine 2 such as a printing press or the like arranged to be driven by a shunt-wound direct current motor 4 as depicted by broken line 6. Motor 4 is provided with a rectifying and starting and running control system 8 supplied from a three-phase source connectable to power supply lines L1, L2 and L3.

Machine motor control system 8 which is partially shown in detail in FIG. 2a is connected through lines L4 and L5 for supplying single-phase power to a pump motor control system 10 shown in detail in FIG. 2b whereby to control pump motor 12 and solenoid-operated valve 14. As depicted by broken line 16, motor 12 drives a lubricant pump 18 to pump lubricant from a suitable reservoir 19 through a main conduit 20 having valve 14 connected therein to and through a pair of branch conduits 22 and 24 to a plurality of feed-in devices 22a and 24a through which the lubricant is applied to bearings and other relatively movable parts of the machine requiring lubrication. Branch conduits 22 and 24 are provided adjacent their extreme ends with pressure-operated switches 22b and 24b, respectively, also shown in FIG. 2b, which open to stop the pump when sufficient lubricant has been applied through the feed-in devices.

The circuit diagram of pump motor control system 10 of FIG. 1 is shown in FIG. 2b. In FIG. 2a, there is illustrated diagrammatically certain details of machine motor control system 8 sufficient to show how certain contacts in pump motor control system 10 are operated.

Referring to FIG. 2a, there are shown power supply lines L1, L2 and L3 connected to a power rectifying and motor controlling circuit 8a which supplies rectified power to the armature winding of machine motor 4. Lines L1 and L2 are connectable through normally open contacts CD1 and CD2 of a control relay CD to the primary winding of a power transformer PT1 the secondary winding of which is connected through lines L4 and L5 to pump motor control system 10. The operating coil of relay CD is connected in series with a normally open "on" manual pushbutton switch SW1 and a normally closed "off" manual pusbutton switch SW2 to the secondary winding of the transformer PT2 the primary winding of which is connected to lines L2 and L3. Relay CD is also provided with a normally open self-maintaining contact CD3 in shunt of switch SW1.

Lines L1 and L2 are also connectable through contacts CD1 and CD2 to the primary winding of a transformer PT3 the secondary winding of which is connected to lines L6 and L7. The operating coil of a relay TR for automatically controlling resetting of an alarm is connected across line L6 and L7. Relay TR is provided with contacts TR1 and TR2 and a time delay device TR3 shown in the lower left-hand portion of pump motor control circuit 10 for controlling the latter as hereinafter described. The operating coil of a machine forward control relay MFR is connectable through a normally open manual pushbutton "forward" switch SW3 and a normally closed manual pushbutton "stop" switch SW4 across lines L6 and L7. Relay MFR is provided with a normally open self-maintaining contact MFR1 in shunt of switch SW3 and a normally open contact MFR2 for energizing the operating coil of a relay MSR across lines L6 and L7. Relay MSR is a machine motor start control relay and also controls initial starting of pump motor control circuit 10 as hereinafter described whereby a lubrication cycle is afforded each time the machine is started. Subsequent lubrication cycles while the machine continues to run are controlled by a time delay relay TD preferably of the pneumatic type. Relay TD is provided with a normally open contact TD1 in series connection with contact MSR1. Relay TD is also provided with a pneumatic time delay device TD2 such as a dashpot or the like affording contact TD1 a time delay in closing of at least two seconds or a time delay long enough to allow complete resetting of a long interval timer LT hereinafter described.

Contacts MSR1 and TD1 are arranged to control a main contactor M and a short interval timer ST. Main contactor M is provided with normally open contacts M1 through M6. Contact M1 is arranged to control an operating solenoid 14a of valve 14 for opening and closing main conduit 20 shown in FIG. 1. Contact M2 is arranged to control a pump motor contactor PM having a normally open contact PM1 for controlling pump motor 12. Contact M3 is arranged to control a lube-on lamp LO to indicate that lubrication is being applied. Contact M4 is arranged in shunt of contact MSR1 whereby to maintain system operation and to complete a lubrication cycle which has been started if the machine is stopped. Contact M5 is arranged to control long interval timer LT. And contact M6 is arranged to maintain energization of time delay relay TD after its original energizing circuit is interrupted by timer LT.

Short interval timer ST is provided with a motor ST1, a clutch solenoid ST2, a spring for resetting the same and a normally closed, timed opening contact ST3. Motor ST1 runs the timer. The clutch which is operated by solenoid ST2 engages the motor for driving a timing mechanism whereby contact ST3 is opened when the timer times out to stop the lubrication cycle in the event either one or both pressure switches 22b and 24b have failed to open. Timer ST is provided with an operating time interval of five minutes or the like which is longer than the time interval normally required for lubrication to be accomplished and for the pressure switches to open.

Long interval timer LT is provided for timing the intervals between lubrication cycles such as two hours or the like. Timer LT is provided with a motor LT1, a clutch solenoid LT2, a spring for resetting the same, a normally closed timed opening contact LT3, a normally open instantaneously closing limit switch LT4 and a normally closed limit switch LT5. Motor LT1 runs the timer. The clutch which is operated by solenoid LT2 engages the motor for driving a timing mechanism whereby contact LT3 is opened when the timer times out to deenergize clutch solenoid LT2 at the end of two hours whereby to start a lubrication cycle. Limit switch LT4 is operated by the timer clutch and closes when the clutch is engaged to maintain energization of the timer in shunt of contact M5. Limit switch LT5 is operated by the timer clutch and closes when the clutch is disengaged to afford operation of time delay relay TD when contact M6 is open.

Pressure switches 22b and 24b are connected in parallel in the circuit of the operating coil of time delay relay TD and are normally closed and are arranged to open when the lubricant pressure at the extreme ends of the branch conduits reaches a predetermined value. The opening of these pressure switches indicates that sufficient lubricant has been applied through the feed-in devices to the points of the machine requiring lubrication and causes restoration of time delay relay TD whereby to stop the pump as hereinafter more fully described.

The aforementioned contact ST3 of the short interval timer also is arranged to control an alarm circuit and a reset circuit for the latter. The alarm circuit is provided with a visual alarm device such as a fail lamp FL, a reset indicator lamp RL and an audible alarm device such as a fail horn FH. A reset relay RS is provided with a normally open contact RS1 for self-maintaining purposes, and normally closed contacts RS2 and RS3 for controlling lamp FL and horn FH, respectively. A manually operable normally open reset switch RSW is provided for energizing reset relay RS when timer contact ST3 is closed. The circuit of horn FH is provided with an intermittently operable device such as a flasher FR. This flasher is provided with a heater element FR1 connected in parallel with horn FH and a normally closed contact FR2 connected in series with both the horn and the heater element. The heater element periodically opens contact FR2 to interrupt the horn circuit intermittently to sound the alarm. As shown in FIG. 2b, the aforementioned elements of control system 10 are supplied with electrical power from lines L4 and L5.

Contacts TR1 and TR2 shown in the lower left-hand portion of FIG. 2 are provided to prevent the alarm from sounding when power is connected to the control system and to avoid the necessity of having to press reset switch RSW when such power is connected. Contact TR1 is a normally closed timed opening contact. Contact TR2 is a normally open timed closing contact and these contacts are provided with a pneumatic time delay device TR3 such as a dashpot or the like affording contact TR1 a time delay in opening and affording contact TR2 a time delay in closing of about two seconds or a time delay long enough to allow opening of contact RS3 to prevent the horn from sounding. Contacts TR1 and TR2 are operated by relay TR in machine motor control system 8 which relay is energized upon connection of power to the latter and to pump motor control system 10. Contact TR1 is arranged so that it will open after two seconds or after energization of the operating coil of reset relay RS and closure of its maintaining contact RS1 whereby relay RS is placed under the control of contact ST3.

The operation of the pump control system of FIG. 2 will now be described with reference to the lubrication system of FIG. 1 and those portions of the machine motor control system shown in FIG. 2a.

Depression of "on" switch SW1 causes energization of the operating coil of relay CD through "off" switch SW2 and closure of its contacts. Contacts CD1 and CD2 connect power from lines L1 and L2 through transformer PT1 to lines L4 and L5 and therethrough to pump motor control system 10. Contact CD3 closes in shunt of switch SW1 to maintain relay CD whereafter switch SW1 may be released to allow it to reopen. Contacts CD1 and CD2 also connect power through transformer PT3 to lines L6 and L7 causing energization of the operating coil of relay TR. As a result, dashpot TR3 starts operating whereby contact TR1 is opened and contact TR2 is closed after a time delay of about two seconds.

During this time delay, pump motor control circuit 10 operates in the following manner.

Connection of power through lines L4 and L5 to pump motor control system 10 causes energization of the operating coil of reset relay RS and lamp RL through contacts ST3 and TR1. Relay RS closes contact RS1 to maintain energization of its operating coil in shunt of contact TR1, opens contact RS2 to interrupt the circuit of lamp FL and opens contact RS3 to interrupt the circuit of horn FH. Such connection of power also causes energization of time delay relay TD through contact ST3, limit switch LT5 and pressure switches 22b and 24b in parallel. After two seconds, contact TR1 opens to place relay RS solely under the control of timer contact ST3. After such two second delay provided by dashpot TR3, contact TR2 closes. As will be apparent, contact TR2 remained open to prevent horn FH from sounding during the interval of time between the connection of power to lines L4 and L5 and opening of contact RS3. The alarm circuit is now reset and lamp RL is lit to indicate this condition. While the alarm circuit can alternatively be reset by pressing manual reset switch RSW, use of contact TR1 automatically or electrically to reset the same when power is connected is preferred. Otherwise, the horn might sound before the operator has time to press switch RSW or before the operator is reminded that the alarm circuit should be reset simultaneously with connection of power. After a similar two second time delay, dashpot TD2 responds to allow relay TD to close contact TD1.

The lubrication system is now in readiness for operation and is automatically or electrically operable to perform a lubrication cycle when the machine to be lubricated is started running. To start motor 4 and machine 2 running, "forward" switch SW3 is pressed to energize relay MFR through stop switch SW4. Relay MFR closes contact MFR1 in shunt of switch SW3 to maintain energization of its operating coil whereafter switch SW3 may be released to allow it to reopen. Relay MFR also closes contact MFR2 to energize relay MSR and closes other contacts to control power connection and control circuit 8a for the machine motor. Relay MSR closes contact MSR1 and closes other contacts to control power connection within circuit 8a. As a result of the controls exercised by relays MFR and MSR, motor 4 is started running. As a result of closure of contact MSR1, the operating coil of main contactor M and motor ST1 and solenoid ST2 of short interval timer ST are energized in parallel through contacts TD1 and MSR1. Motor ST1 starts running and solenoid ST2 actuates a clutch to engage the timer mechanism to the motor to start timing a five minute interval. Main contactor M closes contact M1 to energize solenoid 14a across lines L4 and L5. Solenoid 14a actuates valve 14 in FIG. 1 to open the latter thereby to allow lubricant to pass through main conduit 20 to branch conduits 22 and 24. Contactor M closes contact M2 to energize the operating coil of pump contactor PM across lines L4 and L5. Contactor PM closes contact PM1 to connect pump motor 12 across lines L4 and L5. This causes motor 12 to start running and to drive pump 18 through a shaft or the like depicted by broken line 16. Lubricant then is pumped from reservoir 19 through the main conduit to the branch conduits.

Main contactor M also closes contact M3 to connect lamp LO across lines L4 and L5. Lamp LO is lit to indicate that the lubrication system is "on," that is, that it is functioning. Contactor M closes contact M4 in shunt of contact MSR1 to maintain energization of contactor M and timer ST in the event contact MSR1 should be opened. As will be apparent, contact M4 allows completion of the lubrication cycle if the machine is stopped and contact MSR1 opens. Contactor M closes contact M5 to connect motor LT1 of long interval timer LT across lines L4 and L5 and to connect solenoid LT2 through contact LT3 across lines L4 and L5. This causes energization of motor LT1 to start the latter running and causes energization of solenoid LT2. The latter actuates the clutch to engage the timer mechanism to motor LT1 whereby timer LT starts timing a two hour interval. Contactor M further closes contact M6 to maintain energization of the operating coil of relay TD in shunt of limit switch LT5 which opens as hereinafter described.

The aforesaid actuation of the clutch of timer LT by solenoid LT2 effects instantaneous closure of limit switch LT4 to maintain energization of timer LT in shunt of contact M5. The clutch of timer LT also opens limit switch LT5 but relay TD is maintained energized through contact M6 in parallel therewith.

Motor 12 now continues to run pump 18 and to pump lubricant through the main conduit to the branch conduits. This lubricant is forced through feed-in devices 22a and 24a to the friction points of the machine.

When the lubricant pressure at the ends of the branch conduits reaches a value indicative of sufficient lubricant having been applied through the feed-in devices, pressure switches 22b and 24b open to interrupt energization of relay TD. Since these pressure switches are connected in parallel with one another, both switches must open to deenergize relay TD. This insures that sufficient lubricant has been applied through both branch conduits. Relay TD opens contact TD1 to deenergize contactor M and short interval timer ST whereby the latter resets by spring action or the like to its normal position. Contactor M opens its contacts to deenergize solenoid 14a whereby valve 14 is reclosed, to deenergize contactor PM to stop the pump, to extinguish lamp LO, to interrupt its self-maintaining circuit, to interrupt the original energizing circuit of long interval timer LT and to lock out relay TD. The initial lubrication cycle is now completed and long interval timer LT continues to run since it is maintained through limit switch LT4. The pressure at the ends of the branch conduits decreases and switches 22b and 24b reclose.

At the end of two hours or whatever time interval is set on timer LT, the latter times out and opens its contact LT3 to interrupt energization of solenoid LT2. As a result, the timer clutch disengages and thereby reopens limit switch LT4 and recloses limit switch LT5. Limit switch LT4 interrupts energization of motor LT1 of timer LT. The timer is reset by spring action or the like to its normal position preparatory to timing another two hour interval. Limit switch LT5 reenergizes relay TD which recloses its contact TD1 to reenergize contactor M and short interval timer ST, provided the machine is running and contact MSR1 is closed, thereby to start another lubrication cycle.

Since timer LT is reset by a spring turning it back to its normal starting position when its clutch is disengaged, it requires a certain amount of time for this resetting to be completed. If timer LT is reenergized by closure of contact M5 before it has reached its normal starting position, it will start timing from a position later than its normal starting position and consequently will time out in less than two hours. To avoid this and to insure complete resetting of timer LT before contact M5 closes, relay TD is provided with dashpot TD2 to render contact TD1 timed closing. Therefore, when limit switch LT5 closes to energize the operating coil of relay TD, a time interval of about two seconds elapses before contact TD1 closes thereby to afford time for timer LT to reset completely before contactor M is energized to close contact M5. When contactor M and short interval timer ST are energized at the end of the two hour time period, a second lubrication cycle is started in the manner hereinbefore described for the initial lubrication cycle. In a similar manner, timer LT times out at the end of each additional two hour period to initiate successive lubrication cycles as long as the machine runs.

If the machine is stopped by pressing stop switch SW4 during a lubrication cycle, relays MFR and MSR deenergize and the latter opens contact MSR1. However, contact M4 maintains contactor M and short interval timer ST energized so that the lubrication cycle will be completed in the normal manner.

If the machine is stopped between lubrication cycles by pressing stop switch SW4 but power remains connected to lines L4 and L5, long interval timer LT continues to run. When timer LT times out at the end of two hours, contact LT3 opens, the clutch is disengaged to allow the timer to reset, limit switch LT4 opens to deenergize the timer motor and limit switch LT5 closes to energize relay TD. After a time delay, contact TD1 closes without effect since contacts MSR1 and M4 are open. The system is now in the same condition of readiness for operation as hereinbefore described in conjunction with application of power to lines L4 and L5.

As heretofore mentioned, short interval timer ST is a safety device which insures termination of the lubrication cycle in the event pump 18 does not stop in response to predetermined pressure at the ends of the branch conduits. Assuming that the lubrication cycle is "on" as hereinbefore described and that for some reason one or the other of pressure switches 22b and 24b does not interrupt the circuit of relay TD, at the end of the short time interval of five minutes or whatever time interval is set on timer ST, the latter times out and opens contact ST3. Contact ST3 interrupts the circuit of relay TD to terminate the lubrication in the same manner hereinbefore described in connection with opening of the pressure switches. Contact ST3 also interrupts the circuit of reset relay RS to exhibit and sound alarms and extinguishes lamp RL. The operating coil of relay RS deenergizes and opens its maintaining circuit at contact RS1. Contact RS2 closes to light lube-fail lamp FL and contact RS3 closes to energize horn FH to exhibit and sound an alarm indicative that a failure has occurred in the lubrication system. Heater FR1 is energized in parallel with horn FH periodically to open contact FR2 and to reclose the same intermittently to sound the horn. Contact TD1 opens to deenergize contactor M and timer ST to allow the latter to reset and reclose contact ST3.

The alarm circuit may be reset by manually pressing reset switch RSW momentarily whereby reset relay RS is reenergized and lamp RL is lighted. Contacts RS2 and RS3 interrupt the alarm circuits and contact RS1 maintains relay RS energized whereafter switch RSW may be released to allow it to reopen.

While the invention hereinbefore described is effectively adapted to fulfill the objects stated, it is to be understood that we do not intend to confine our invention to the particular preferred embodiment of unattended lubrication system disclosed, inasmuch as it is susceptible of various modifications without departing from the scope of the appended claims.

We claim:
1. In an unattended electrically operable lubrication system having an electric motor operated pump for pumping lubricant through a conduit to and through a plurality of feed-in devices to respective parts of a machine to be lubricated, the improvement comprising:
  a fail-safe electrical control system for operating the pump motor comprising:
  means for connecting electrical power to said control system;
  a timer operable to time a desired interval between successive applications of lubricant;
  first electroresponsive means operable to energize the pump motor and timer thereby to start the pump and to start said timer;
  second electroresponsive means energized in response to connection of power to said control system for completing a first point in the circuit of said first electroresponsive means;
  third electroresponsive means responsive to initiation of operation of the machine for completing said circuit to operate said first electroresponsive means thereby to start the pump;
  a normally-closed pressure-operated switch arranged to be opened when the pump creates a predetermined fluid pressure in the conduit indicative that sufficient lubricant has been applied to the machine parts;
  said pressure-operated switch being effective to deenergize said second electroresponsive means thereby to restore said first electroresponsive means and to stop the pump motor;
  said pressure-operated switch being operable to reclose when the pressure in the conduit decreases after the pump motor is stopped;
  and means responsive to said timer at the end of said desired time interval for reenergizing said second electroresponsive means to start another like lubrication cycle provided said third electroresponsive means has not been restored.

2. The invention defined in claim 1, wherein said fail-safe electrical control system also comprises:
  a second timer operable to time a short time interval slightly longer than the time interval between starting of the pump and normal opening of said pressure switch;
  said circuit which is completed to operate said first electroresponsive means also being effective to start said second timer;
  alarm means operable to indicate that said second electroresponsive means has failed to deenergize and stop the pump motor;
  resetting means energized in response to said connection of power to the control system for rendering said alarm means ineffective and for completing a self-maintaining circuit;
  means responsive to said second timer at the end of said short time interval if said completed circuit has not been interrupted for deenergizing said second electroresponsive means thereby to restore said first electroresponsive means and to stop the pump motor and for deenergizing said resetting means to cause operation of said alarm means;
  and time delay means responsive to said connection of power to the control system for maintaining said alarm means ineffective until after said resetting means has energized and for interrupting the original energizing circuit of said resetting means after its self-maintaining circuit has been completed thereby to prevent operation of said alarm means when power is connected to said control system.

3. The invention defined in claim 2, together with:
  manual means operable to energize said resetting means to reset said alarm means to its ineffective condition after the latter has been operated by said second timer responsive means.

4. The invention defined in claim 3, wherein:
  said second timer responsive means is connected in series with said manual means so that said second timer responsive means is capable of deenergizing said resetting means if said manual means is held operated.

5. In an unattended electrically operable and condition responsive lubrication system having an electric motor operated pump for pumping lubricant through a conduit to and through a plurality of feed-in devices to respective parts of a machine to be lubricated, the improvement comprising:

a fail-safe electrical control system for periodically operating the pump motor comprising:

means for connecting electrical power to said control system;

a self-resettable long interval timer operable to time a predetermined interval between successive applications of lubricant and to complete a self-maintaining circuit;

first electroresponsive means operable to energize the pump motor and said timer thereby to start the pump and said timer running;

an electroresponsive relay energized in response to said connection of power to the control system and being effective to close a contact in the operating circuit of said first electroresponsive means and said timer;

means for initiating operation of the machine to be lubricated;

second electroresponsive means operable in response to said initiation of operation of the machine for completing said operating circuit thereby to energize said first electroresponsive means to start the pump and said timer;

means responsive to energization of said first electroresponsive means for completing a maintaining circuit for said relay;

a normally-closed pressure-operated switch associated with the conduit and being operable to interrupt said maintaining circuit to deenergize said relay when the pump produces a predetermined fluid pressure indicative that sufficient lubricant has been applied to the machine parts, deenergization of said relay causing deenergization of said first electroresponsive means to stop the pump and to interrupt the original energizing circuit of said timer and said maintaining circuit for said relay;

said pressure-operated switch reclosing when the pressure decreases after the pump is stopped;

and said timer being operable at the end of said time interval for interrupting its maintaining circuit to cause said timer to reset and to close a circuit it shunt of said relay maintaining circuit through said pressure-operated switch to energize said relay thereby to start another lubrication cycle provided said second electroresponsive means has not been restored.

6. The invention defined in claim 5, wherein said fail-safe electrical control system also comprises:

a self-resettable short interval timer operable to time a predetermined time interval slightly longer than the time between starting of the pump and opening of said pressure-operated switch;

means connecting said short interval timer for energization simultaneously with energization of said first electroresponsive means thereby to start timing;

an alarm device and an energizing circuit therefor rendered operable when power is connected to said control system;

a resetting relay for said alarm device;

a manual resetting switch for energizing said resetting relay to interrupt the circuit of said alarm device and to complete a self-maintaining circuit in shunt of said manual resetting switch;

and means responsive to connection of power to said control system for energizing said resetting relay independently of said manual resetting switch and for maintaining the circuit of said alarm device open until said resetting relay has interrupted the same thereby to prevent energization of said alarm device when power is so connected;

and a contact responsive to said short interval timer timing out if said pressure-operated switch fails to open for deenergizing said electroresponsive relay and said resetting relay to stop the pump and energize said alarm device.

7. The invention defined in claim 6, wherein said means for energizing said resetting relay independently of said manual resetting switch comprises:

a time delay relay operable to energize responsive to connection of power to said control system, said relay comprising;

a normally closed contact in series connection with said short interval timer contact through which said resetting relay is energized; and a normally open contact in the circuit of said alarm device for preventing energization of said alarm device until said resetting relay interrupts the circuit of said alarm device;

and said time delay relay causing opening of its normally closed contact and closing of said normally open contact after said resetting relay has interrupted the circuit of said alarm device.

References Cited by the Examiner
UNITED STATES PATENTS

| 2,339,532 | 1/1944 | Venable | 184—7 |
| 2,581,314 | 1/1952 | Walker | 184—7 |
| 2,620,896 | 12/1952 | Davis | 184—7 |
| 2,971,610 | 2/1961 | Yingling | 184—7 |

LAVERNE D. GEIGER, *Primary Examiner.*

MILTON KAUFMAN, *Examiner.*